United States Patent Office 3,558,500
Patented Jan. 26, 1971

3,558,500
METHOD FOR THE CONTROL OF SCALE USING N,N-DIMETHYLAMIDES OF 18 CARBON UN-SATURATED CARBOXYLIC ACIDS
Cecil George Hollis, Germantown, and Richard William Lutey, Memphis, Tenn., assignors to Buckman Laboratories, Inc., Memphis, Tenn., a corporation of Tennessee
No Drawing. Filed Feb. 7, 1968, Ser. No. 703,548
Int. Cl. C02b 5/06; C07c 103/12; C08h 9/00
U.S. Cl. 252—180
12 Claims

ABSTRACT OF THE DISCLOSURE

The addition of N,N-dimethylamides of 18 carbon unsaturated carboxylic acids to an aqueous system is effective in controlling scale.

---

This invention relates to the control of scale formation and to the removal of existing scale encountered in various manufacturing processes utilizing flowing water.

Water as available for industrial use regardless of its source (surface or well water) is never pure but contains various impurities which may be dissolved gases, dissolved solids, and, in addition, may also include suspended solids. Although these solids, both dissolved and suspended, are generally inorganic, occasionally they may be of organic origin. Furthermore, the concentration of the impurities present in the process water tends to increase during the manufacturing procedure. This result follows because in usual industrial practice certain materials are added to the water to serve a specific function during the manufacturing process and practical manufacturing procedures dictate the reuse of the process water to the greatest possible extent.

Many of these impurities precipitate during the manufacturing process resulting in the formation of encrusting and/or non-encrusting scales. Regardless of the form of the resulting scale, the end result is objectionable because the presence of scale materially decreases the overall efficiency of the process, both as to quantity and quality of the final desired product.

Many methods have, therefore, been proposed in an endeavor to control scale including demineralization by the use of ion exchange resins, flocculation, chelation, and other chemical methods of treatment to solubilize, stabilize, disperse, and/or remove materials causing the formation of scale. None of these methods, however, is entirely satisfactory. For example, the use of sequestering agents, such as ethylenediamine tetracetic acid, are practical in only a few applications. Other methods heretofore proposed for overcoming the problem of scaling have involved inhibiting the formation of scale and/or attacking the scale directly. The former method requires the use of inhibitors such as the polyphosphates or other chemicals. This method is objectionable because it requires the mixing of a number of components in order to tailor the resultant combination to the particular water, a time consuming and difficult procedure. In addition, the polyphosphate method usually involves extensive water bleed-off and pH control through acid or alkali addition. The method of direct attack consists of adding high concentrations of acid to the equipment, such as sulfuric or muriatic acid or combinations of alkaline materials such as sodium hydroxide or sodium metasilicates. This method suffers from the difficult handling problems associated with the use of strong acids or alkalies and the tendency of these materials to attack metallic equipment.

It is, therefore, a principal object of the present invention to provide a composition for the control of scale which obviates the disadvantages of such composition heretofore available.

Another object of this invention is to provide a relatively inexpensive and simplified process whereby the deposition of scale in flowing water systems is reduced.

Yet another object of our invention is to prepare more efficient scale remover compositions that are based upon low cost and widely available materials.

Other objects and advantages of the present invention will become apparent from the following detailed description thereof.

To the accomplishment of the foregoing and related ends, this invention comprises the features hereinafter fully described and particularly pointed out in the claims, the following description setting forth in detail certain illustrative embodiments of this invention. These are indicative, however, of but a few of the various ways in which the principle of the invention may be employed.

Briefly stated, we have discovered that the addition of a relatively small amount of an N,N-dimethylamide of a straight chain unsaturated carboxylic acid to the aqueous system is very effective in controlling scale in said system.

Suitable N,N-dimethylamides of straight chain carboxylic acids are those prepared from carboxylic acids containing 18 carbon atoms. The acids are further characterized by having at least one carbon to carbon double bond. Specific acids classified within this category include: oleic, linoleic, linolenic, ricinoleic, and mixtures thereof. The N,N-dimethylamides of the foregoing acids are identified as N,N-dimethyloleamide, N,N-dimethyllinoleamide, N,N-dimethyllinolenamide, and N,N-dimethylricinoleamide, respectively. Also suitable are the mixed acids found in tall, castor, corn, cottonseed, linseed, olive, peanut, rapeseed, safflower, sesame, and soybean oils. A mixture of carboxylic acids particularly suitable for use in our invention is that available commercially as tall oil fatty acids under the trademark Unitol ACD. A typical analysis of this product is as follows:

TABLE I

| | Specification range | Typical analysis |
|---|---|---|
| Fatty acids, percent | 98.8–99.7 | 98.9 |
| Rosin acids, percent | 0.2–0.6 | 0.5 |
| Unsaponifiables, percent | 0.1–0.6 | 0.6 |
| Linoleic acid, percent | | 45 |
| Oleic acid, percent | | 51 |
| Saturated acid, percent | 2.0–2.8 | 2.4 |
| Acid number | 198–201 | 199 |
| Saponification number | 198–202 | 200 |
| Color, Gardner | 3— –4— | 3+ |
| Viscosity: | | |
| SSU, 100° F | | 105 |
| Gardner, seconds | | 0.9 |
| Specific gravity, 60° F./60° F | | 0.905 |
| Titre, °C | —1–1.0 | 0.0 |
| Flash point, °F | | 375 |
| Fire point, °F | | 435 |

The dimethylamides of these tall oil fatty acids will hereinafter be referred to as DMA.

The amount and manner of use of the scale control compositions are dependent on the nature of problems caused by scale and the general composition of the scale in a particular system. In those systems which consistently require descaling, it is generally best to first remove heavy deposits of scale during a period when the system is not operating, followed by the maintenance of small quantities of the compositions in contact with the surfaces during operation to prevent redeposition of scale. For purposes of descaling, the compositions may be sprayed, brushed, or otherwise applied in undiluted form or may be diluted with suitable solvents for ease of application. Where it is not possible to add the undiluted compositions to surfaces, the N,N-dimethylamides can be added to aqueous solutions of various concentrations of cleaning substances such as caustic soda, metasilicate of soda, and similar materials. The amount of the compositions used in these aqueous cleaning solutions will vary from 1 to 100 lbs. of the compositions to each 1,000 gallons of cleaning solution, or a concentration of about 0.01 percent to 1.0 percent by weight of the total solution. The amount of the compositions required depend on the nature of the surface to be cleaned, the nature and tenacity of the scale, the time allowed for contact of the surfaces with the compositions, and the temperature of the cleaning solutions containing the compositions.

In aqueous systems where descaling is to be accomplished during operation and in aqueous systems where the compositions are utilized to prevent the deposition of scale, the N,N-dimethylamides are used at concentrations of 0.2 to 200 parts of the compositions per million parts by weight of the aqueous system, with the prefered range being 0.5 to 100 parts per million parts of the compositions. It is understood, of course, that larger quantities may be used, but such is not generally desirable because costs may be increased without commensurate additional beneficial results.

While we do not wish to be bound by any theory as to how our results are produced, we believe the primary action of the N,N-dimethylamides of the straight chain unsaturated carboxylic acids is one of coating small particulate precipitated masses of inorganic molecules, thereby preventing them from further bonding together into large masses and their subsequent deposition on surfaces within the manufacturing process. We also believe that the compositions adhere to the surfaces of systems, thereby reducing or preventing the sticking or deposition of inorganic scale-like solids to these surfaces. In addition, evidence exists that the N,N-dimethylamides aid in the penetration of aqueous systems containing the compositions into already formed scales, thereby allowing for the gradual erosion of the scale. Whatever the exact nature of the action of the compositions, the inorganic chemical substances are maintained in a dispersed state and do not grow in size or adhere to the surfaces of equipment in such a way or to such an extent as to cause the problems encountered when the compositions are not added to the system.

In order to disclose the nature of the invention still more clearly, the following illustrative examples will be given. It is understood, however, that the invention is not limited to the specific conditions or details set forth in these examples, except insofar as such limitations are specified in the appended claims.

EXAMPLE 1

The effectiveness of DMA as an inhibitor to the formation of scale in a cooling tower was determined by comparing the results obtained in a cooling operation wherein DMA was added to the system to a similar cooling operation in the absence of DMA. In the absence of DMA, scale of a semisolid nature consisting primarily of alumina formed rapidly as a deposit on the slats and other surfaces of the cooling tower. Continuation of the operation caused the dislodgment of portions of the scale. These dislodged portions tended to plug sprays, drains, and water lines. Furthermore, these portions provided an excellent substrate for further scale deposition in the system.

After mechanically removing the scale, DMA was added to the system at a rate of 1.0 lb. per 1,000 gallons of water (equivalent to about 120 parts DMA per. million parts of water) flowing through the system. This addition of DMA prevented the formation of alumina scale or any other scale; consequently, the surface of the cooling tower remained in a clean condition.

EXAMPLE 2

In this example, the effectiveness of DMA as an inhibitor to the formation of scale in a steam turbine condenser was determined by comparing the results obtained when operating the condenser using cooling water to which DMA had been added to a similar operation in the absence of DMA. When the condenser was operated using untreated fresh water, the condenser tubes became coated with an inorganic scale. Analysis of the scale showed that it was composed of iron oxides, calcium carbonate, silica and insoluble silicate complexes. The extent of the accumulation of scale was such that it was necessary to shut down the turbine and related equipment approximately every seventh day in order to clean the condenser mechanically.

The turbine condenser was cleaned by recycling an alkaline cleaning solution containing 70 lbs. of DMA per 1,000 gallons of solution through the tubes and related equipment for a period of approximately 6 hrs. at a temperature of approximately 145° F. This was followed by a cold rinse of process water containing 14.4 lbs. of DMA per 1,000 gallons of rinse water.

After the condenser tubes were cleaned, the turbine and related equipment were operated as before except that the cooling water contained about 1.30 parts of DMA per million parts of process water. No scale was formed in either the condenser tubes or associated piping even after several weeks operation when the cooling water contained the DMA.

EXAMPLE 3

This example demonstrates that the addition of DMA to a caustic solution is very effective in not only removing scale from evaporators but, in addition, materially increases the operating time of the evaporators so descaled between boilouts. The particular sugar mill at which this test was conducted experienced a severe problem of scale formation in the heating tubes of the cane juice evaporators. This buildup of scale was such that it was necessary to stop the production of sugar at very frequent intervals to clean or descale the evaporators with a 10 percent caustic solution followed by an acid flush. In the second series of operations, DMA was added to the caustic solution at a rate of 8 lbs. of DMA per 1,000 gallons of caustic solution. By using this DMA-containing caustic solution in the routine manner followed by an acid flush, the operating time of the evaporators was increased so appreciably that the number of tons of cane ground between boilouts was increased by almost 100 percent.

Total sugarcane ground was 26,250 tons when a caustic solution was followed by an acid wash.

Total sugarcane ground was increased to 52,000 tons at the same mill for the same period of time when DMA was added to the caustic solution in an amount corresponding to 8 lbs. of DMA per 1,000 gallons of caustic solution.

Similar results were obtained when the dimethylamides of the fatty acids previously listed were substituted for DMA.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

We claim:

1. A scale control process which comprises adding to an aqueous system susceptible to scale formation a composition comprising an N,N-dimethylamide of a straight chain carboxylic acid, characterized in that said acid contains 18 carbon atoms and at least one carbon to carbon double bond, in an amount sufficient to inhibit the formation of scale in said aqueous system.

2. The process of claim 1 wherein the straight chain carboxylic acid is a mixture of straight chain carboxylic acids containing 18 carbon atoms and at least one carbon to carbon double bond.

3. The process of claim 1 wherein the straight chain carboxylic acid is a mixture of acids derived from tall oil.

4. The process of claim 1 wherein the straight chain carboxylic acid is a mixture of acids derived from linseed oil.

5. The process of claim 1 wherein the straight chain carboxylic acid is a mixture of acids derived from soybean oil.

6. The process of claim 1 wherein the straight chain carboxylic acid is a mixture of acids derived from cottonseed oil.

7. The process of claim 1 wherein the straight chain carboxylic acid is a mixture of acids derived from corn oil.

8. The process of claim 1 wherein the straight chain carboxylic acid is a mixture of acids derived from peanut oil.

9. The process of claim 1 wherein the N,N-dimethylamide is N,N-dimethyloleamide.

10. The process of claim 1 wherein the N,N-dimethylamide is N,N-dimethyllinoleamide.

11. The process of claim 1 wherein the N,N-dimethylamide is N,N-dimethyllinolenamide.

12. The process of claim 1 wherein the N,N-dimethylamide is N,N-dimethylricinoleamide.

References Cited
UNITED STATES PATENTS

| | | | |
|---|---|---|---|
| 2,518,148 | 8/1950 | Jordan | 260—21X |
| 3,134,759 | 5/1964 | Kirkpatrick | 260—97.5X |

JOHN T. GOOLKASIAN, Primary Examiner

M. E. McCAMISH, Assistant Examiner

U.S. Cl. X.R.

134—3, 41; 252—82; 260—21, 97.5, 404, 102